3,308,530
METHOD OF CONTROLLING POROSITY OF REFRACTORY METAL STRUCTURES
Roberto Levi, New York, N.Y., and Gary C. Irons, Stamford, Conn., assignors to North American Philips Co., Inc., New York, N.Y., a corporation of Delaware
No Drawing. Filed Mar. 12, 1964, Ser. No. 351,512
5 Claims. (Cl. 29—420.5)

This invention relates to methods of controlling the porosity of refractory metal structures, and in particular to a method for treating the surface of a machined porous refractory metal structure to restore substantially the surface porosity as established in the formation of the original refractory metal body.

There are many devices today which require a porous refractory metal body or structure for successful operation; particularly the condition of the surface pores may be critical in such devices as, for instance, ionizers for ion engines, gas bearings, and dispenser cathodes These refractory metal structures are generally manufactured by techniques like that disclosed in U.S. Patents 2,669,008 and 2,721,372. In this process, refractory material powder of the required particle size and distribution for the application in question is provided and then compacted generally under pressure and sintered at a very high temperature to produce a highly dense, fully sintered, mechanically strong, porous refractory metal structure in which the pores are generally interconnected. The desired number of pores and/or their size and/or the pore density may be controlled by the powder size and sintering schedule. Since the high temperature sintering invariably causes shrinkage or distortion in the size or shape of the final body, a machining operation is necessary, and for this purpose a filler material is introduced into the pores of the body During the machining operation, we now find that some refractory metal may be smeared over the surface tending to cover some of the pores. The filler is removed by heating at an elevated temperature, generally in vacuum, to evaporate same. While this operation tends to open up many of the closed surface pores, still a substantial number of such pores may remain at least partially obstructed. Also, in the manufacture of a dispenser cathode, when the porous body is impregnated with molten barium aluminate and other materials as described in U.S. Patents Nos. 2,700,000; 2,869,017; and 2,917,415, there is some dissolution of the surface tungsten which tends to remove the smeared refractory metal, but still a complete restoration of the surface porosity cannot be ensured.

Any closed or obstructed surface pores may interfere with achieving the optimum operation of the above-mentioned devices. For instance, the operation of a porous tungsten ionizer is closely associated with the size and number of pores per unit surface area, and in general, the smaller the pores and the greater their number, the higher will be the ionization efficiency. Thus, the loss of pores tends to reduce efficiency. Likewise, gas bearings which depend on gas permeability may exhibit impaired performance with obstruction of any of the surface pores. In the case of the dispenser cathodes, closed pores may increase the migration length of the barium required to obtain full surface coverage, which may lead to lower emission levels.

One object of the invention is a method for treating the porous refractory metal structure to restore substantially its original surface porosity.

A further object of the invention is a surface treatment for machined porous refractory metal structures to re-open surface pores smeared over with metal during the machining operation.

These and other objects and advantages attendant on the invention are obtained by subjecting the machined refractory metal structure, prior to removal of the filler material which facilitated its machining, to an etching treatment with a reagent which attack primarily the refractory metal leaving the filler material mostly or substantially undisturbed. We have found that this process is extremely simple to carry out, involving little additional cost to the manufacture of the desired product, and at the same time is highly successful in restoring the desired surface porosity. On the other hand, etching treatments employed on the refractory metal matrix after removal of the filler material caused a substantial alteration in the porous structure throughout the entire body when compared to the porous structure established during the sintering operation, and was thus undesirable. In addition, possible contamination by any etchant residues was present. Still further, subjecting the impregnated body to an etching treatment or reagent which attacks both the refractory metal and the filler caused the surface pores to become distorted to a funnel shape, which was objectionable in certain applications for the resultant structures. The use of a reagent operable substantially only or mainly on the refractory metal with a minimum effect on the filler material, which thus serves to confine the material removal to the outer surface portions only, avoided the foregoing difficulties.

In accordance with a further feature of the invention, when the machining treatment employed has resulted in a smearing of the filler material over the surface of the refractory metal body, which might obstruct the action of the reagent effective on the refractory metal, the smeared filler material is removed by mechanical means, such as by polishing with abrasive paper.

The invention will now be described in greater detail with reference to several exemplary embodiments thereof.

A machined tungsten ionizer was made as follows. Tungsten powder with a particle size distribution in the range of 1–6 microns was compressed to form a slug or ingot with a pressure of, for example, 35,000 pounds per square inch, and the compacted slug sintered in a neutral or reducing atmosphere at 2100° C. for several hours, e.g., 4 hours in hydrogen, to form a fully sintered, strong, sturdy matrix with a density of about 82% of the theoretical density for tungsten. In order to machine such a body to the shape desired, which may be a disc, button, strip, annulus, etc., a filler material is provided in the pores of the tungsten body. Thus, for example, copper is melted into the pores by heating the sintered slug or ingot in contact with copper in a reducing atmosphere to 1400° C. Then the machining operations are performed, such as turning, boring, milling, planing or grinding. These machining operations, we now find, tend to smear some of the tungsten metal over the surface covering or obstructing some of the pores. With certain of the aforementioned machining operations—grinding or polishing being the main exceptions—the copper also tends to smear over the surface which then becomes colored pink, rather than gray, which is the usual color of the sintered tungsten. In this latter case, it is preferred to remove the smeared copper before the etching treatment. This is preferably effected by polishing the surface copper off using aluminum oxide paper. As noted before, the freshly-machined surface exhibits a pink color, and if then within a short time is subjected to the polishing operation with the aluminum oxide paper, the operator can observe when the surface copper has been removed by the color change from ping to gray. However, if the machined, filler-material-filled refractory metal body is permitted to stand for any substantial length of time, the copper will oxidize and take on a gray appearance so that it is more difficult to determine when all of the smeared copper surface has been removed. For this reason, it is preferred to carry out the smeared filler-material removal step as soon as possible after the machining operation. It does not appear desirable to attempt the removal of the smeared copper by employing a reagent which will attack only the filler metal or both the filler metal and the refractory metal. Our experience has been that such a pre-etching treatment cannot be sufficiently controlled to avoid some etching of the copper below the tungsten surface so that when the reagent is subsequently employed on the tungsten, it attacks not only the top or outermost tungsten surface but also the interior tungsten pore sides causing funnel-shaped pores. However, as noted at the outset, with certain machining treatments, such as grinding, there is no appreciable smearing of the copper or filler metal over the adjacent tungsten. In this case, this filler-metal-removal pre-treatment is unnecessary.

The filler-material-impregnated tungsten body is then subjected to the etching treatment in accordance with the invention. A reagent is employed which will attack primarily the tungsten but not the copper. One suitable reagent is the well-known Murakami etch, an example of which is a solution of 10 grams of $K_3Fe(CN)_6$ and 10 grams of NaOH or KOH in 100 milliliters of $H_2O$. As a rule, the machined body is first degreased, and then immersed at room temperature into the aforementioned Murakami etch to remove the desired thickness of the disturbed layer. The time of etching depends upon the type of machining used which determines the thickness of the disturbed layer. For instance, a grinding operation causes a greater depth of smeared tungsten than a milling operation. We have etched ground tungsten for approximately 5 minutes in the above solution and obtained very satisfactory results. Excessive etching should be avoided to preserve dimensions of the body. Of course, after removal from the etching solution, the body should be thoroughly washed to remove all etchant residues. After the etching treatment, the body is placed in a vacuum furnace and heated to a temperature of 1750° C. to volatilize and thus completely remove the copper filler metal from the pores. Photomicrographs taken of the surface of the resultant body have demonstrated substantially complete restoration of the original surface porosity of the fully sintered tungsten.

The ionizer may be completed by mounting same on a suitable support to seal off a cavity containing the cesium boiler, as is well known in the art. In operation, the cesium atoms flow through the porous tungsten body and thereupon become ionized and subsequently evaporated from the surface into an electrostatic accelerating system. The thrust reaction obtained from this process may be used to propel space vehicles.

In the manufacture of a dispenser cathode, essentially the same steps as above described may be employed in the preparation of the fully sintered refractory metal matrix, its subsequent machining treatment, and the subsequent removal of the filler material which facilitated the machinery The cathode is completed as described in the patents above mentioned by impregnating the resultant porous structure with the molten emissive material. For example, a pre-fused mixture of 5 moles of barium carbonate, 2 moles of aluminum oxide, and 3 moles of calcium oxide is melted into the pores of the tungsten body by heating them together in a hydrogen atmosphere to approximately 1750° C. Afterwards, the cathode is activated in the usual manner by heating it in the electron device at a temperature of approximately 50–100° C. above its normal operating temperature.

While in the specific examples described above, tungsten was the refractory metal employed, it will be appreciated that the invention is applicable with many of the refractory metals which have been heretofore disclosed in the art as useful in connection with these refractory metal porous structures, such as rhenium, molybdenum, and tantalum for the ionizer, and molybdenum-tungsten alloys for the dispenser cathode. In addition, as disclosed in the patents mentioned above, silver and gold may be substituted for the copper as the filler material. Even non-metal fillers, e.g., polymerized plastics, may be used to the extent that a reagent is available which will attack the refractory metal and not the non-metal filler. It will further be evident that other reagents which will mainly attack the refractory metal with little effect on the filler may be substituted in the chemical etching treatments for the specific etchants previously described. For instance, for the copper-filled tungsten, a hot 5% $H_2O_2$ aqueous solution may be used, though the Murakami etchant is preferred.

It is clear from the foregoing that we have provided a method which we have found highly successful for restoring the original surface porosity of the sintered refractory metal or body without distorting the shape of the surface pores. This has proven to be a valuable technique in the manufacture of the above-noted refractory metal structures, especially for the applications herein described, and has afforded an important improvement in the resultant operation of the completed device. The inventive technique is simple to apply even to very complicated shapes and structures.

While we have described our invention in connection with specific embodiments and applications, other modifications thereof will be readily apparent to those skilled in this art without departing from the spirit and scope of the invention as defined in the appended claims.

What is claimed is:

1. A method of making a porous refractory metal body of desired shape and dimensions and porosity, comprising the steps of sintering at a high temperature a mass of particles of a refractory metal consisting essentially of tungsten or an alloy thereof to form a body with the desired porosity, infiltrating the pores of the body with a filler material to facilitate subsequent machining of the body, machining the infiltrated body to the desired shape and dimensions, said machining operation causing smearing of refractory metal over the surface thereof, thereafter, while the filler material remains in the pores, subjecting the machined body to a chemical etching treatment with a reagent which will attack substantially only the refractory metal leaving the filler material substantially undisturbed until the smeared refractory metal has been substantially removed, and thereafter removing the filler material from the pores.

2. A method as set forth in claim 1 wherein the machined body is subjected to a polishing treatment to remove any smeared filler material prior to the etching treatment.

3. A method as set forth in claim 2 wherein the polishing treatment is carried out with aluminum oxide paper immediately after the matching treatment.

4. A method as set forth in claim 1 wherein the filler material is copper.

5. A method as set forth in claim 4 wherein the reagent is a Murakami etchant.

References Cited by the Examiner

UNITED STATES PATENTS

| | | | |
|---|---|---|---|
| 2,304,166 | 12/1942 | Hatfield | 29—424 |
| 2,663,928 | 12/1953 | Wheeler | 29—149.5 |
| 2,669,008 | 2/1954 | Levi | 29—424 X |
| 2,916,814 | 12/1959 | Meijering et al. | 29—424 |

JOHN F. CAMPBELL, *Primary Examiner.*

P. M. COHEN, *Assistant Examiner.*